(12) United States Patent
Reinhart

(10) Patent No.: US 7,194,129 B1
(45) Date of Patent: Mar. 20, 2007

(54) METHOD AND SYSTEM FOR COLOR SPACE CONVERSION OF PATTERNED COLOR IMAGES

(75) Inventor: Craig C. Reinhart, Moorpark, CA (US)

(73) Assignee: Biomorphic VLSI, Inc., Westlake Village, CA (US)

( * ) Notice: Subject to any disclaimer, the term of this patent is extended or adjusted under 35 U.S.C. 154(b) by 885 days.

(21) Appl. No.: 10/361,138

(22) Filed: Feb. 6, 2003

(51) Int. Cl.
*G06K 9/00* (2006.01)

(52) U.S. Cl. ..................................... 382/167

(58) Field of Classification Search ............... 382/166, 382/167; 348/272, 273, 280
See application file for complete search history.

(56) References Cited

U.S. PATENT DOCUMENTS 6,392,699 B1 * 5/2002 Acharya .................... 348/273

* cited by examiner

*Primary Examiner*—Phuoc Tran
(74) *Attorney, Agent, or Firm*—Klein, O'Neill & Singh, LLP

(57) ABSTRACT

A method and system for converting a patterned color image in a first color space to a second color space, prior to image compression is provided. The process includes, dividing the image into plural tiles; converting the plural tiles from the first color space to the second color space; retaining certain pixel values in the second color space; discarding certain pixel values in the second color space; and creating a pattern in the second color space, similar to the patterned color image in the first color space. Also, a method for decoding a compressed image pattern from a first color space to second color space is provided. The method includes, assembling pixels from a first pattern based on the first color space; transforming triplets form the first color space to the second color space; and determining pixel values for a dominant color.

39 Claims, 7 Drawing Sheets

| G | R | G | R | G | R | G | R | G | R |
|---|---|---|---|---|---|---|---|---|---|
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |

FIGURE 1 (Prior Art)

| G00 | R01 | G02 | R03 | G04 | R05 | G06 | R07 |
|---|---|---|---|---|---|---|---|
| B10 | G11 | B12 | G13 | B14 | G15 | B16 | G17 |
| G20 | R31 | G22 | R23 | G24 | R25 | G26 | R27 |
| B30 | G31 | B32 | G33 | B34 | G35 | B36 | G37 |

100

| Y00 | Cr01 | Y02 | Cr03 | Y04 | Cr05 | Y06 | Cr07 |
|---|---|---|---|---|---|---|---|
| Cb10 | Y11 | Cb12 | Y13 | Cb14 | Y15 | Cb16 | Y17 |
| Y20 | Cr31 | Y22 | Cr23 | Y24 | Cr25 | Y26 | Cr27 |
| Cb30 | Y31 | Cb32 | Y33 | Cb34 | Y35 | Cb36 | Y37 |

| Y00 | Y02 | Y04 | Y06 |
|---|---|---|---|
| Y11 | Y13 | Y15 | Y17 |
| Y20 | Y22 | Y24 | Y26 |
| Y31 | Y33 | Y35 | Y37 |

417

| Cr01 | Cr03 | Cr05 | Cr |
|---|---|---|---|
| Cr31 | Cr23 | Cr25 | Cr27 |

418

| Cb10 | Cb12 | Cb14 | Cb16 |
|---|---|---|---|
| Cb30 | Cb32 | Cb34 | Cb36 |

METHOD AND SYSTEM FOR COLOR SPACE CONVERSION OF PATTERNED COLOR IMAGES

BACKGROUND OF THE INVENTION

1. Field of the Invention

This invention relates to image processing, and more particularly, to color space conversion of patterned, color images.

2. Background

Digital cameras are commonly used today. Typically, a digital camera uses a sensor that converts light into electrical charges. The image sensor employed by some digital cameras is a charge coupled device (CCD), while others use complementary metal oxide semiconductor (CMOS) technology.

Digital cameras store pixel values for an image array as digital data. This digital data may then be transferred to a computing device, including, desktop, notebook or laptop computers, embedded systems and/or personal digital assistants for viewing. A high bandwidth connection will be required to move the image from the digital camera to a viewer at a computing system (for example, a personal computer, cell phone, or PDA) at a reasonable rate (for example, 15–30 frames per second for video), if the data is not compressed. Bandwidth may be defined in units of number of bits per pixel, number of pixels per frame, and number of frames per second. Typically, the connection speed between a digital camera and computing systems is not very high. Hence, some form of image compression, is applied prior to the transfer of data from the digital camera to computing system.

To represent a high quality color image, each pixel in a pixel array must contain tri-stimulus color data (for example, red, green, and blue). Generating such data in a digital camera requires that each light detector location in an image sensor produce data for three colors. Such a system is quite complex and expensive to build. To reduce system complexity, color image sensors commonly used in digital cameras (both video and still) use a mosaic pattern of single colored light detectors, typically red, green and blue. Each detector location produces only one of the three required colors. Such a system reduces the amount of silicon area required by the sensor, reduces the complexity of circuitry required by the system, and reduces the amount data to be managed by the system. But, these reductions come at the cost of providing insufficient data to create a full color image. Thus, additional processing is required to produce the two missing colors at each detector location (pixel).

FIG. 1 depicts one such mosaic pattern 100, commonly referred to as a "Bayer pattern". In pattern 100, each detector location collects red (R) 103, green (G) 101, or blue (B) 102 light. Green light detectors (101) are more abundant than red (103) and blue (102) detectors to match the characteristics of human visual system. To create a full color image the two "missing colors" at each location are inferred through an interpolation process using data from neighboring detector locations. This data is further processed through a color reconstruction algorithm to make a presentable picture.

FIG. 3 shows a flow diagram of various process steps that occur in conventional image processing systems. Based on auto-focus 302B, an image sensor detects pixel values in step S300. In step S301, a dark current reduces noise introduced by the image sensor. In step S302, defect concealment is performed by an image processing unit and white balancing occurs in step S303. In step S304, color interpolation is performed. In step S305, black level flare correction is performed, and then color correction is performed in step S306. In step S307, gamma correction is performed, and edge enhancement is performed in step S308. In step S309, color space conversion occurs and then compression unit 206 (FIG. 2) compresses image data.

The most widely used compression scheme for digital cameras is provided by the JPEG standard, published by an ISO based standards organization as "International Standard ISO/IEC 15444 Part 1", incorporated herein by reference in its entirety. The following steps are utilized by the JPEG encoding (also referred to as compression) algorithm to compress images:

Color Space Conversion: A color image in the red, green, and blue (RGB) color space contains high spatial frequency data and thus does not lend itself to high compression ratios without suffering significant information loss. A luminance/chrominance (YCbCr) space is a popular choice for a compression color space because two of the three components (the red and blue chrominance components) contain predominately low spatial frequency data and thus provide high compression ratios with minimal information loss. The third component (luminance) contains high spatial frequency data, but it is similar to the original green component image. Thus, through a simple, reversible (loss less) color space conversion (RGB to YCbCr) larger compression ratios are achieved. One such set of equations (expressed in matrix form) to convert from RGB to YCbCr color space are:

$$\begin{bmatrix} Y \\ Cb \\ Cr \end{bmatrix} = \frac{1}{256} \begin{bmatrix} 65.738 & 129.057 & 25.064 \\ -37.945 & -74.494 & 112.439 \\ 112.439 & -94.154 & -18.285 \end{bmatrix} \times \begin{bmatrix} R \\ G \\ B \end{bmatrix} + \begin{bmatrix} 16 \\ 128 \\ 128 \end{bmatrix} \quad (I)$$

Various other sets of equations may also be used such as those specified by the ITU Radiocommunication Sector (formerly CCIR). (*A Technical Introduction to Digital Video* by Charles A. Poynton, John Wiley & Sons, Inc. publisher, 1996, TSBN:0-471-12253-X)

Subsampling: Since red and blue chrominance components contain predominately low frequency data they are sub-sampled in either vertical or horizontal dimensions, or in both dimensions to achieve a significant amount of compression without undue image degradation.

Frequency Transformation: Images captured by digital cameras contain a large amount of redundant spatial information when viewed by an observer. This redundant information can be removed without detection by the human observer thus increasing the compression ratio. To identify this redundant information, image data is transformed from its native spatial representation to a signal frequency based representation via a Discrete Cosine Transform. This is transformation reversible (loss less).

Quantization: With the image represented in frequency space, redundant information is identified and removed by quantizing (in frequency space) pixel values to predetermined levels. These levels (quantization coefficients) determine the amount of compression and the amount of image quality degradation. Higher levels of quantization result in larger compression ratios (smaller encoded images) and more degradation. The quantization process is irreversible (lossy).

Entropy Coding: The quantization step results in large numbers of pixel values (in frequency space) being reduced to small values. Using variable code length techniques (e.g. Huffman encoding) these small values are encoded based on their predicted frequency of occurrence. Values that occur more often are assigned short bit sequences, and those that occur less often are assigned long bit sequences. The entropy coding process is reversible (loss less).

Compressed images must be decompressed before being viewed. The following steps are utilized by JPEG decoding (decompression) algorithm for decompressing a compressed image:

Entropy Decoding: Using techniques from the field information theory (e.g. Huffman decoding) variable length bit encoded bit strings are converted to quantized frequency coefficients.

Dequantization: Quantized frequency coefficients are expanded (dequantized) to values within the range of the originally derived (prior to quantization during encoding) values. Since the quantization step is lossy, the exact original values are, in general, not recovered. Instead, close approximations (based on the amount of compression loss) are recovered.

Spatial Transformation: Image displays require data to be represented in the spatial domain, not the frequency domain. This conversion back to the spatial domain from the frequency domain is achieved via the Inverse Discrete Cosine Transform.

Up-sampling: If the red and blue chrominance component images were sub-sampled during encoding, they are up-sampled by duplicating each pixel value in either the horizontal or vertical dimension, or in both dimensions.

Color Space Conversion: Most digital image displays (for example, computer monitors) require image data to be in the RGB color space. The equations to convert from YCbCr (luminance/chrominance) color space to RGB color space can be expressed in matrix form as follows:

$$\begin{bmatrix} R \\ G \\ B \end{bmatrix} = \frac{1}{256} \begin{bmatrix} 298.082 & 0.0 & 408.583 \\ 298.082 & -100.291 & -208.120 \\ 298.082 & 516.411 & 0.0 \end{bmatrix} \times \begin{bmatrix} Y \\ Cb \\ Cr \end{bmatrix} - \begin{bmatrix} 16 \\ 128 \\ 128 \end{bmatrix} \quad \text{(II)}$$

Various other sets of equations may also be used such as those specified by the ITU Radiocommunication Sector (formerly CCIR). (See *A Technical Introduction to Digital Video* by Charles A. Poynton, John Wiley & Sons, Inc. publisher, 1996, ISBN:0-471-12253-X). It is noteworthy that RGB to YCbCr and YCbCr to RGB equations are a "matched set" to ensure that no additional information loss occurs.

Although the JPEG compression technique has been described above, other compression schemes for example, MPEG, Wavelet, Loss less JPEG may be also be used to achieve high compression rates with minimal image quality degradation. These techniques typically use similar steps as those described above, especially the Color Space Conversion. The specific coefficients used in the color space conversion however, may vary from those given above.

Conventional image processing techniques used in digital cameras have disadvantages. For example, as shown by FIG. 3 process steps, various image processing steps are performed before data is compressed after step S309. These steps use resources and slow down the process.

Also, once a full color image is available after color interpolation and reconstruction processing is complete, the amount of data is increased three times after the reconstruction. In conventional techniques, for example, in a 1 Mega pixel digital camera, sensor data is first converted to 3 million bytes (although raw image data is for 1 million pixels for one color only, the other two colors are estimated at each location) and then each pixel is converted from RGB to YCbCr and the data is compressed. Not only the data is tripled from 1 million bytes to 3 million bytes, the compressed data also results in poor edge quality.

Therefore, there is a need for a method that efficiently converts mosaic image data into a color space that can efficiently compress the mosaic image data.

SUMMARY OF THE INVENTION

In one aspect of the present invention, a method for converting a patterned color image in a first color space to a second color space, prior to image compression is provided. The process includes, dividing the image into plural tiles; converting the plural tiles from the first color space to the second color space; retaining certain pixel values in the second color space; discarding certain pixel values in the second color space; and creating a pattern in the second color space, similar to the patterned color image in the first color space. The method also includes, separating similar color components in the pattern based on the second color space.

In one aspect of the present invention, the first color space may be a red-green-blue (RGB) color space and the second color space may be a luminance/chrominance (YCbCr) color space, while the patterned color image is based on the Bayer mosaic pattern.

In another aspect of the present invention, the patterned color image may be a non-Bayer pattern image, the first and second color space may be any tristimulus color space and the tiles may have any combination of red, green and blue pixels.

In another aspect of the present invention, a system with a compression unit for converting a patterned color image in a first color space to a second color space, prior to image compression is provided. The system divides the image into plural tiles; converts the plural tiles from the first color space to the second color space; retains certain pixel values in the second color space; discards certain pixel values in the second color space; and creates a pattern in the second color space, similar to the patterned color image in the first color space. The system separates similar color components in the pattern based on the second color space. The system may be used in a digital camera.

In yet another aspect of the present invention, a method for decoding a compressed image pattern from a first color space to second color space is provided. The method includes, assembling pixels from a first pattern based on the first color space; transforming triplets from the first color space to the second color space; and determining pixel values for a dominant color. The first color space may be a luminance/chrominance (YCbCr) color space and the second color space may be a red-green-blue (RGB) color space.

In one aspect of the present invention, sensor data is directly converted from one color space to another without performing the various steps in FIG. 3. Hence a lower compression ratio may be used which reduces image degradation.

In one aspect of the present invention, since the Bayer pattern contains twice as many green pixels as red or blue (and thus, twice as many luminance samples as red or blue chrominance samples), the sub-sampling step described above for the encoding process is eliminated.

In yet another aspect of the present invention, the "up-sampling" step during decoding is not required because sub-sampling is not used during encoding.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit, the invention. The drawings include the following Figures:

FIG. 1 shows a block diagram of a Bayer Mosaic image pattern, used according to one aspect of the present invention;

FIG. 4D is a block diagram showing input mosaic pattern image in a first color space and output mosaic pattern image in a second color space according to one aspect of the present invention;

FIG. 4E is a block diagram showing components of the mosaic image pattern in the second color space as shown in FIG. 4D.

DETAILED DESCRIPTION OF THE PREFERRED EMBODIMENTS

To facilitate an understanding of the preferred embodiment, the general architecture and operation of a digital camera system will be described. The specific architecture and operation of the preferred embodiment will then be described with reference to the general architecture of the digital camera system.

Figure 2:
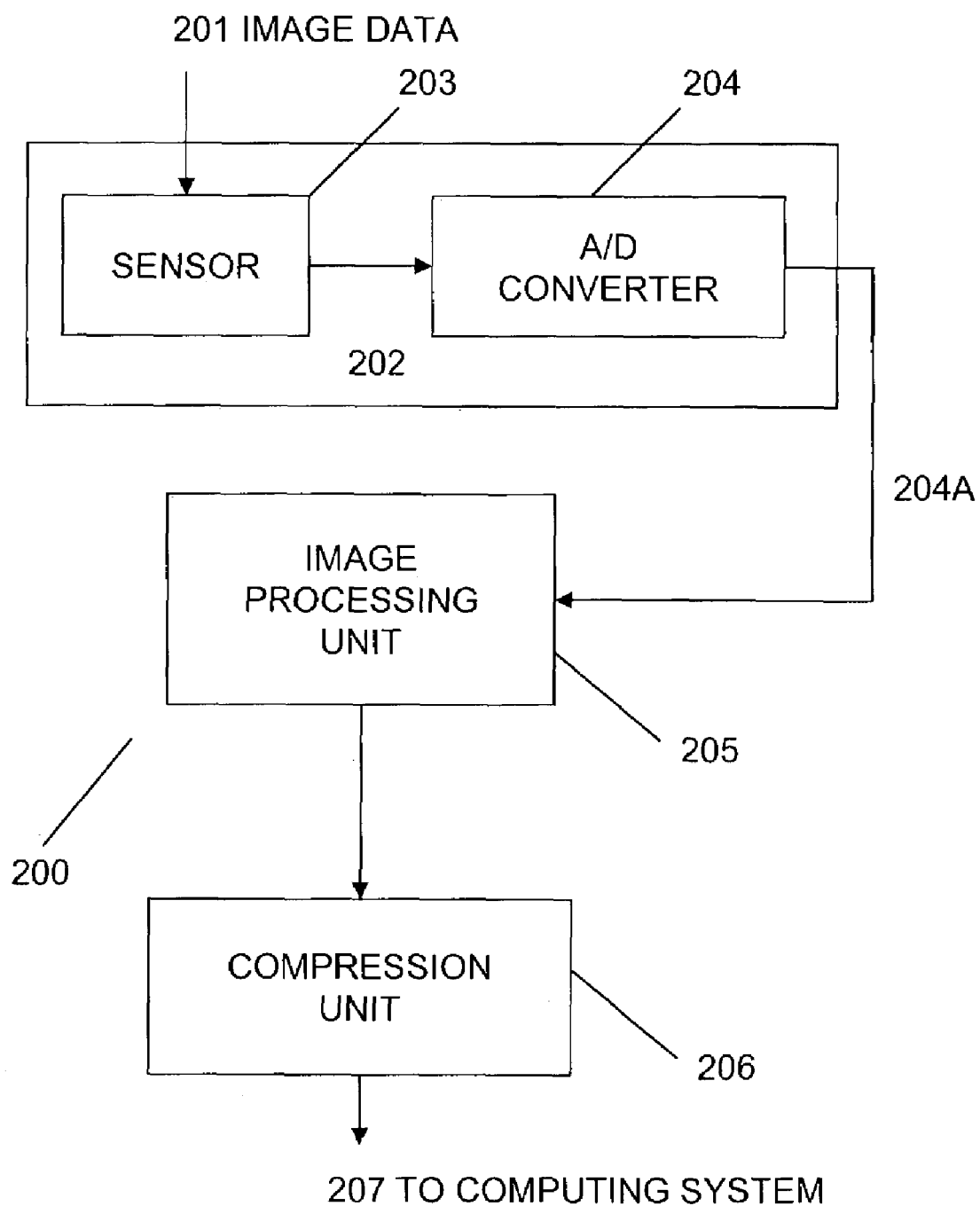
FIG. 2 is a block diagram of a digital camera system used according to one aspect of the present invention.

FIG. 2 shows a block diagram of a digital camera system 200 that receives image data 201 via image capturing unit 202. Image capturing unit 202 includes an image sensor 203 and analog/digital (A/D) converter 204. Image sensor 203 captures raw pixel value of images as analog data, which is converted into digital data by A/D converter 204. Digital image data 204A is then sent to an image-processing unit 205 and thereafter to a compression unit 206. Compression unit 206 may include a processor or specialized ASIC to execute the various adaptive aspects of the present invention that are described below. Compressed image data 207 is then sent to a computing system (not shown) for viewing and/or processing.

The foregoing only provides a top-level description of a digital camera system. As is well known in the art, flash memory may be used by the digital camera system to store compressed images. Also, the various units on FIG. 2 may be included on a single chip or embedded microprocessor.

In one aspect of the present invention, an efficient color space conversion process is used that allows efficient image compression without excessive image distortion.

Figure 4A:
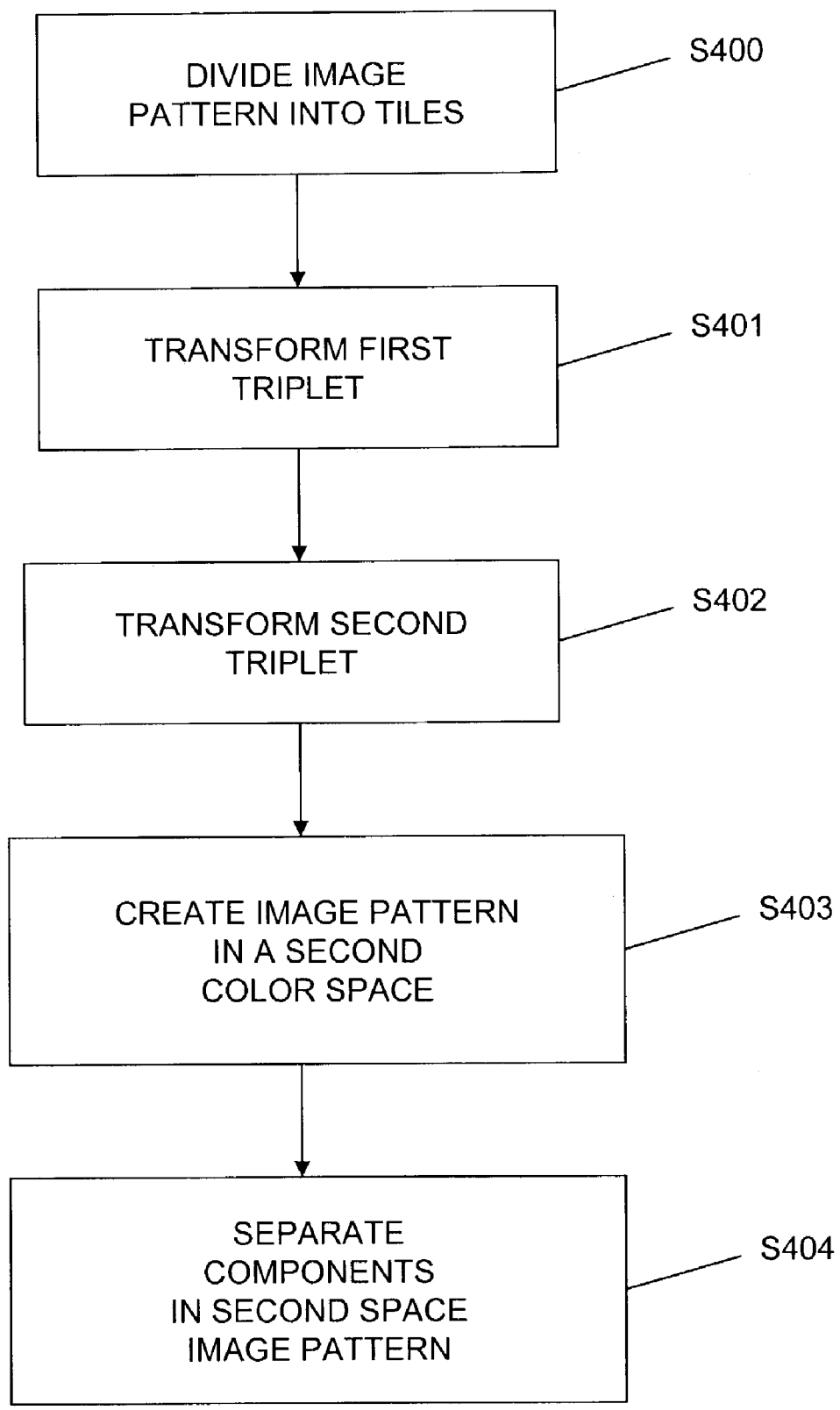
FIG. 4A is a flow diagram of a process for color space conversion according to one aspect of the present invention.

FIG. 4A provides a flow diagram of process steps for color space conversion, according to one aspect of the present invention. Image compression expects a fully populated tri-stimulus image as input. For a Bayer mosaic pattern, 100, the color space conversion process, according to the present invention, takes RGB triplets and converts them to luminance/chrominance (YCbCr) triplets. Since each Bayer pixel values contain only a single color, multiple pixels are used in creating the triplets. The Bayer mosaic pattern is divided into tiles of four pixels and converted from RGB to YCbCr as described below.

Figure 4B:
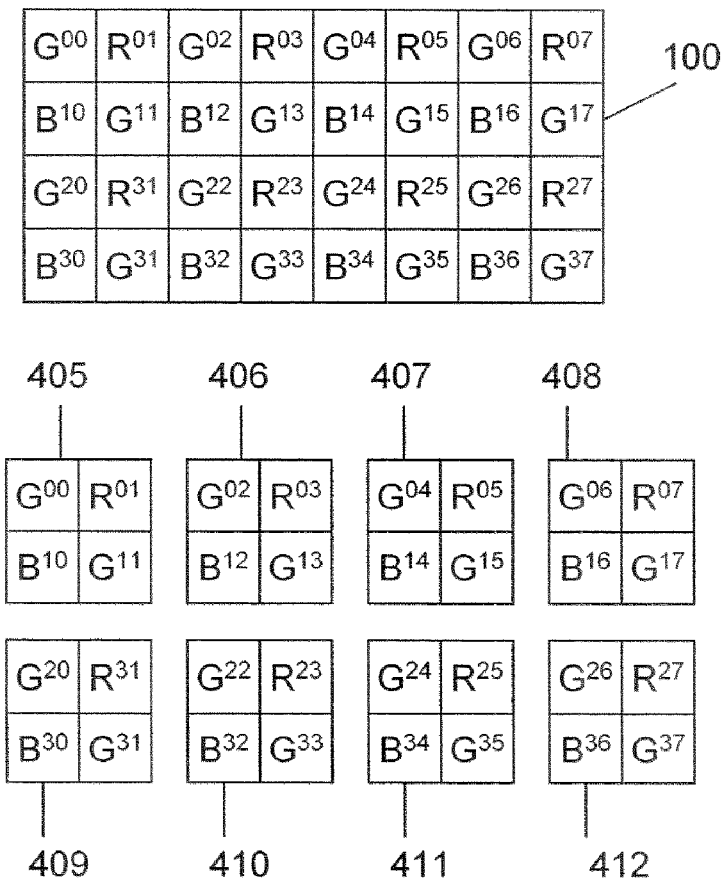
FIG. 4B is a block diagram showing a mosaic pattern sub-divided into tiles, according to one aspect of the present invention.

Turning in detail to FIG. 4A, in step S400, image pattern 100 is converted into tiles. FIG. 4B shows an example of pattern 100 converted into tiles 405–411. Each tile includes two green pixels, one blue and one red pixel. It is noteworthy that pattern 100 is only used to illustrate one aspect of the present invention. Any other pattern with any other color combination may be used, according to the adaptive aspects of the present invention.

Figure 4C:
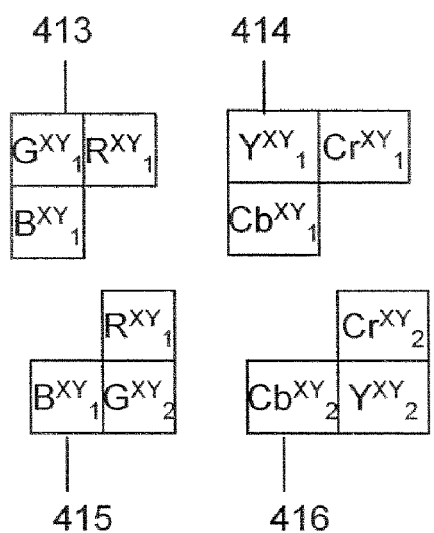
FIG. 4C is a block diagram showing triplets for color space conversion, according to one aspect of the present invention.

In step S401, a first triplet is transformed by applying the Luminance/Chrominance transformation matrix I, described above. For example, matrix I is applied to a triplet comprising of the $G_1$, $R_1$, and $B_1$ pixels (triplet 413 in FIG. 4C) to transform the first triplet from RGB color space to YCbCr color space. It is noteworthy that the present invention is not limited to matrix I, any other matrix can be used for the transformation. This produces $Y_1$, $Cr_1$ and $Cb_1$ (as shown by triplet 414 in FIG. 4B).

In step S402, a second triplet is transformed by applying the Luminance/Chrominance transformation matrix I, described above. For example, a triplet consisting of the $G_2$, $R_1$, and $B_1$ pixels (triplet 415 in FIG. 4B) may be transformed from RGB color space to YCbCr. This produces $Y_2$, $Cr_2$ and $Cb_2$ (as shown by triplet 416 in FIG. 4C).

Steps S401 and S402 are performed until all the triplets within a tile and all tiles within a mosaic image are transformed from RGB to YCbCr color space.

In step S403, a YCbCr Bayer mosaic pattern is created by retaining $Y_1$, $Cr_1$, $Cb_1$, and $Y_2$ values and discarding $Cr_2$ and $Cb_2$. FIG. 4D shows pattern 100 converted into pattern 100A with the YCbCr values.

In step S404, individual components of YCbCr Bayer mosaic pattern 100A are separated. FIG. 4E shows an example of the three sets of individual components, 417, 418 and 419 with Y, Cb and Cr values, respectively. Components 417–419 are then used as input for image compression performed by compression unit 206.

Since the $Cr_2$ and $Cb_2$ values are discarded an actual implementation to compute these values is not required. Furthermore, since pattern 100 contains twice as many green pixels as red or blue (and thus, twice as many luminance samples as red or blue chrominance samples), the sub-sampling step described above for the encoding process may be eliminated. If more compression is desired and additional loss is tolerable, further sub-sampling may be applied.

The format of the components (417–419) from step S404 conforms to the 4:2:2 specifications for JPEG or MPEG image compression and hence standard compression techniques may be used for image compression after color space conversion.

Decoding

Figure 5:
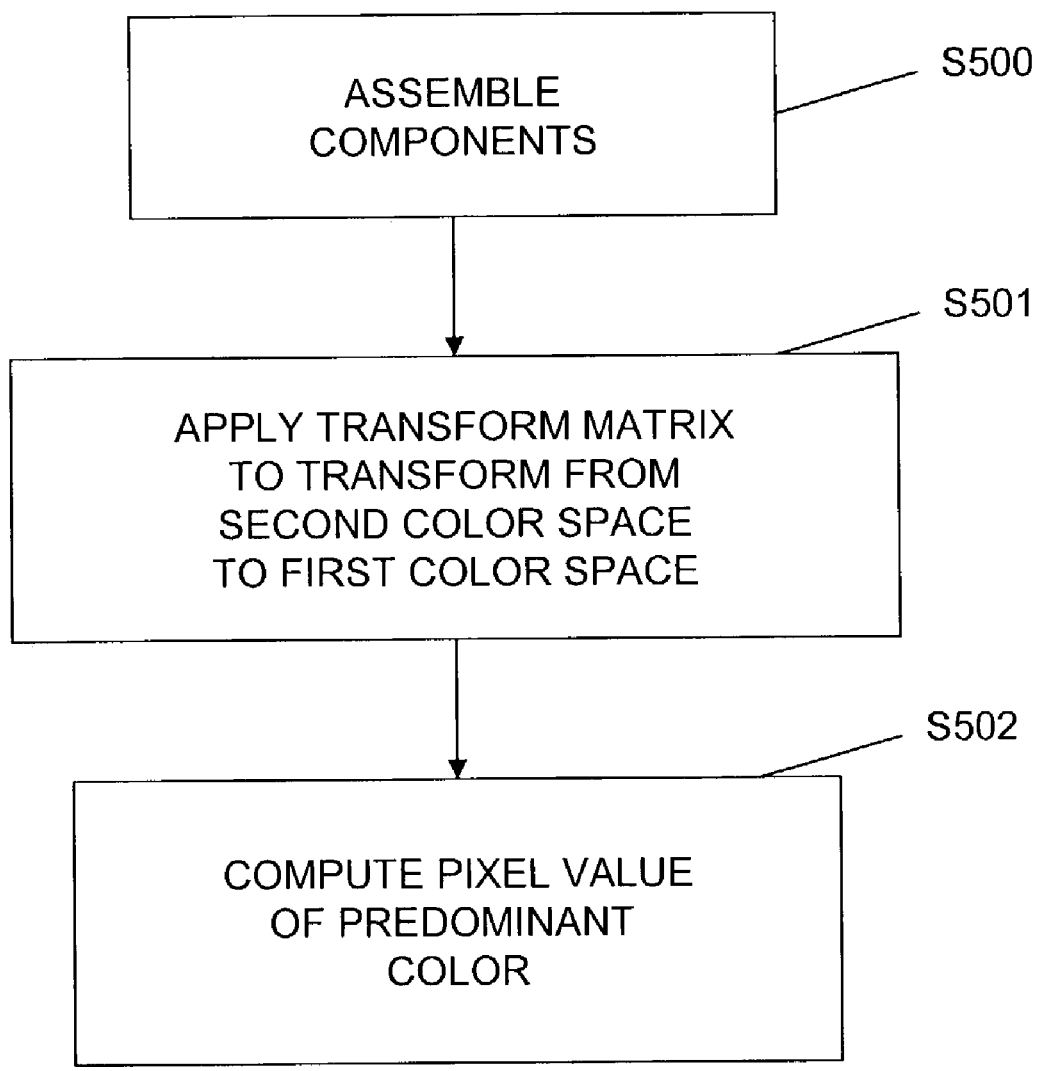
FIG. 5 is a flow diagram of process steps for decoding a compressed image, according to one aspect of the present invention.

FIG. 5 shows a flow diagram of process steps for decoding (decompressing) image data, according to one aspect of the present invention. The first three steps of image decoding proceed as specified by the selected compression process (JPEG or MPEG, or any other process). If the sub-sampling step was not incorporated into the encoding process (as described above with respect to FIG. 4A), the up-sampling step is not needed in the decoding process. If the sub-sampling step was incorporated into the encoding process then the up-sampling step must be performed. Decoding proceeds by considering blocks of four pixels ($Y_1CbCrY_2$ pixel blocks) similar to the encoding process except that the tiles consist of two luminance (Y) pixels and two chrominance (Cb and Cr) pixels. The color space conversion step from YCbCr to RGB (which includes reconstruction of the Bayer mosaic pattern image 100) occurs as described below, according to one aspect of the present invention.

Turning in detail to FIG. 5, in step S500, Y, Cb and Cr components (417–419, FIG. 4E) are assembled.

In step S501, the YCbCr to RGB color space transformation matrix (II) is applied to the triplets consisting of $Y_1$, $Cr_1$, and $Cb_1$ pixels. This produces $G_1$, $R_1$ and $B_1$ (413, FIG. 4C) pixel values.

In step S502, pixel values for the predominant pixels are determined. For example, $G_2$ may be determined from $Y_2$, $R_1$ and $B_1$ using a formula similar to the following:

$$G_2 = \frac{(256.0 \times (Y_2 - 16)) - (R_1 \times 65.738) - (B_1 \times 25.065)}{129.057} \quad \text{(III)}$$

The exact formula will be dependent on the RGB to YCbCr matrix selected for the encoding process.

This formula (III) is used because the $Cb_2$ and $Cr_2$ used to complete the ($Y_2$, $Cb_2$, $Cr_2$) triplet [used in the YCbCr to RGB color space transformation formula given above] were discarded during the encoding process (step S403). However, since $R_1$ and $B_1$ are fully recovered (decoded) those values can be used, along with $Y_2$ to recover $G_2$ because those are similar to the values used in the (R, G, B) triplet that produced $Y_2$ in step S402.

The foregoing describes a method for converting a mosaic pattern color image created by a digital imaging device into a color space suitable for encoding into a size that reduces bandwidth requirements for image transfer from a digital camera to viewer while maintaining quality of the resultant image. Although the "Bayer" mosaic pattern 100 has been used with specific pair of color space conversion matrices, the process can be easily adapted to any system utilizing a mosaic color filter array by dividing the image into a set of tiles, where each tile contains at least one of each of the native color filter array colors and every pixel within the array is included in at least one tile. The present invention can be adapted to use any color filter arrays (besides the Red-Green-Blue described above). It can be adapted to use any shape of tile (besides the square tiles) and any color space conversion matrix pairs.

Figure 3:
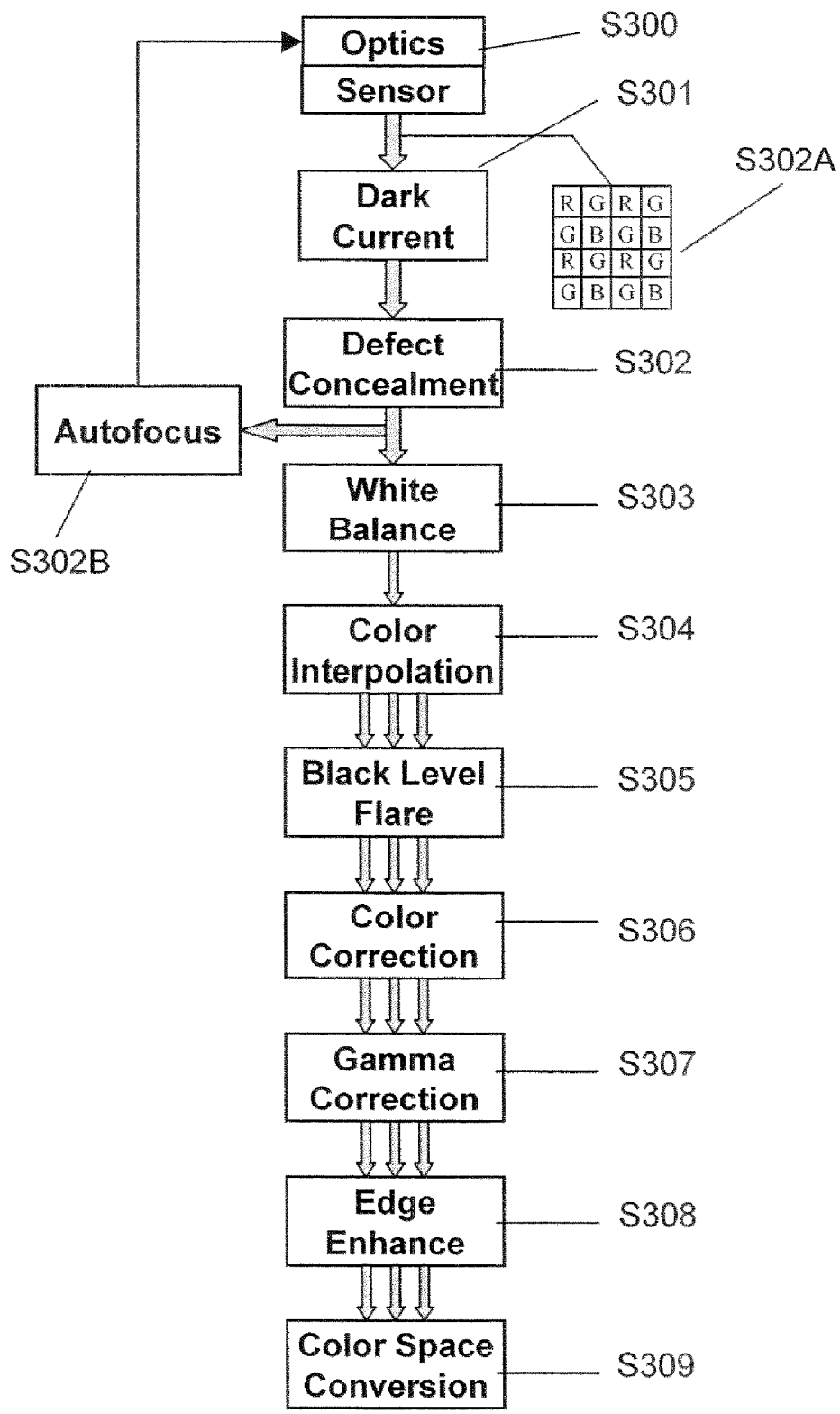
FIG. 3 is a top-level flow diagram showing various process steps involved in image processing.

In one aspect of the present invention, sensor data is directly converted from one color space to another without performing the various steps in FIG. 3. Hence a lower compression ratio may be used which reduces image degradation.

In one aspect of the present invention, since the Bayer pattern contains twice as many green pixels as red or blue (and thus, twice as many luminance samples as red or blue chrominance samples), the sub-sampling step described above for the encoding process is eliminated.

In yet another aspect of the present invention, the "up-sampling" step during decoding is not required because sub-sampling is not used during encoding.

Although the present invention has been described with reference to specific embodiments, these embodiments are illustrative only and not limiting. Many other applications and embodiments of the present invention will be apparent in light of this disclosure and the following claims.

What is claimed is:

1. A method for converting a patterned color image in a first color space to a second color space, prior to image compression, comprising:
   dividing the image into plural tiles;
   converting the plural tiles from the first color space to the second color space;
   retaining certain pixel values in the second color space;
   discarding certain pixel values in the second color space; and
   creating a pattern in the second color space, similar to the patterned color image in the first color space.

2. The method of claim 1, further comprising:
   separating similar color components in the pattern based on the second color space.

3. The method of claim 1, wherein the first color space may be a red-green-blue (RGB) color space.

4. The method of claim 1, wherein the second color space may be a luminance/chrominance (YCbCr) color space.

5. The method of claim 1, wherein the patterned color image is based on a Bayer mosaic pattern.

6. The method of claim 1, wherein the tiles include two green, a red and a blue pixel.

7. The method of claim 1, wherein a transformation matrix is applied to a first triplet and a second triplet with green pixels.

8. The method of claim 1, wherein the chrominance values for red and blue pixels are discarded after the transformation matrix is applied to the second triplet.

9. The method of claim 1, wherein the patterned color image may be a non-Bayer pattern image.

10. The method of claim 1, wherein the first color space may be any tristimulus color space.

11. The method of claim 1, wherein the second color space may be any tristimulus color space.

12. The method of claim 1, wherein the tiles may have any combination of red, green and blue pixels.

13. The method of claim 1 wherein a transformation matrix is applied to a first triplet and a second triplet with any color pixels.

14. Computer-executable process steps on a computer readable medium for converting a patterned color image in a first color space to a second color space, prior to image compression, comprising:
   dividing the image into plural tiles;
   converting the plural tiles from the first color space to the second color space;
   retaining certain pixel values in the second color space;
   discarding certain pixel values in the second color space; and
   creating a pattern in the second color space, similar to the patterned color image in the first color space.

15. Computer-executable process steps of claim 14, further comprising:
   separating similar color components in the pattern based on the second color space.

16. Computer-executable process steps of claim 14, wherein the first color space may be a red-green-blue (RGB) color space.

17. Computer-executable process steps of claim 14, wherein the second color space may be a luminance/chrominance (YCbCr) color space.

18. Computer-executable process steps of claim 14, wherein the patterned color image is based on a Bayer mosaic pattern.

19. Computer-executable process steps of claim 14, wherein the tiles include two green, a red and a blue pixel.

20. Computer-executable process steps of claim 9, wherein a transformation matrix is applied to a first triplet and a second triplet with green pixels.

21. Computer-executable process steps of claim 14, wherein the chrominance values for red and blue pixels are discarded after the transformation matrix is applied to the second triplet.

22. Computer-executable process steps of claim 14, wherein the patterned color image may be a non-Bayer pattern image.

23. Computer-executable process steps of claim 14, wherein the first color space may be any tristimulus color space.

24. Computer-executable process steps of claim 14, wherein the second color space may be any tristimulus color space.

25. Computer-executable process steps of claim 14, wherein the tiles may have any combination of red, green and blue pixels.

26. Computer-executable process steps of claim 14, wherein a transformation matrix is applied to a first triplet and a second triplet with any color pixels.

27. A system for converting a patterned color image in a first color space to a second color space, prior to image compression, comprising:
    a compression unit, wherein the compression unit divides the image into plural tiles;
    converts the plural tiles from the first color space to the second color space;
    retains certain pixel values in the second color space;
    discards certain pixel values in the second color space; and
    creates a pattern in the second color space, similar to the patterned color image in the first color space.

28. The system of claim 27, wherein the compression unit separates similar color components in the pattern based on the second color space.

29. The system of claim 27 wherein the first color space may be a red-green-blue (RGB) color space.

30. The system of claim 27, wherein the second color space may be a luminance/chrominance (YCbCr) color space.

31. The system of claim 27, wherein the patterned color image is based on a Bayer mosaic pattern.

32. The system of claim 27, wherein the tiles include two green, a red and a blue pixel.

33. The system of claim 27, wherein a transformation matrix is applied to a first triplet and a second triplet with green pixels.

34. The system of claim 27, wherein the chrominance values for red and blue pixels are discarded after the transformation matrix is applied to the second triplet.

35. The system of claim 27, wherein the patterned color image may be a non-Bayer pattern image.

36. The system of claim 27, wherein the first color space may be any tristimulus color space.

37. The system of claim 27, wherein the second color space may be any tristimulus color space.

38. The system of claim 27, wherein the tiles may have any combination of red, green and blue pixels.

39. The system of claim 27, wherein the compression unit is used in a digital camera.

* * * * *